United States Patent
Kim et al.

(10) Patent No.: US 11,604,952 B2
(45) Date of Patent: Mar. 14, 2023

(54) ARTIFICIAL INTELLIGENCE APPARATUS USING SOUND SIGNAL CLASSIFICATION AND METHOD FOR THE SAME

(71) Applicant: LG Electronics Inc., Seoul (KR)

(72) Inventors: Jaehong Kim, Seoul (KR); Hangil Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 606 days.

(21) Appl. No.: 16/653,504

(22) Filed: Oct. 15, 2019

(65) Prior Publication Data

US 2020/0042823 A1  Feb. 6, 2020

(30) Foreign Application Priority Data

Sep. 19, 2019  (KR) .................. 10-2019-0115367

(51) Int. Cl.
| | |
|---|---|
| *G10L 15/16* | (2006.01) |
| *G06K 9/62* | (2022.01) |
| *G06N 3/08* | (2023.01) |
| *G06N 20/00* | (2019.01) |
| *H04W 52/02* | (2009.01) |
| *G06F 3/16* | (2006.01) |
| *G06F 3/01* | (2006.01) |
| *G10L 21/0208* | (2013.01) |

(52) U.S. Cl.
CPC .............. *G06K 9/628* (2013.01); *G06F 3/011* (2013.01); *G06F 3/16* (2013.01); *G06K 9/6256* (2013.01); *G06N 3/08* (2013.01); *G06N 20/00* (2019.01); *G10L 15/16* (2013.01); *G10L 21/0208* (2013.01); *H04W 52/0229* (2013.01); *H04W 52/0235* (2013.01); *G06F 2203/011* (2013.01)

(58) Field of Classification Search
USPC ......................................... 704/231–233, 259
See application file for complete search history.

(56) References Cited

U.S. PATENT DOCUMENTS

| | | | |
|---|---|---|---|
| 2015/0302722 A1* | 10/2015 | Berezhnyy | A61M 21/00 340/565 |
| 2016/0292584 A1* | 10/2016 | Weinberg | G06N 7/005 |
| 2016/0375578 A1* | 12/2016 | Zhu | B25J 13/08 700/253 |
| 2017/0213450 A1* | 7/2017 | Park | A61B 5/02416 |
| 2019/0069154 A1* | 2/2019 | Booth | G06F 1/3231 |
| 2020/0089653 A1* | 3/2020 | Hong | G06N 3/0454 |
| 2020/0205580 A1* | 7/2020 | Sayadi | A47C 31/008 |
| 2020/0281521 A1* | 9/2020 | Cail | A61B 5/02055 |
| 2021/0031000 A1* | 2/2021 | Lee | A61B 5/6892 |

* cited by examiner

*Primary Examiner* — Leonard Saint-Cyr
(74) *Attorney, Agent, or Firm* — Fish & Richardson P.C.

(57) ABSTRACT

A method for controlling an AI apparatus mounted on home appliance, the method comprising: receiving a sound signal at a predetermined time; removing noises of the received signal and separating the signal from which the noises are removed, into a signal by a user and a device signal; acquiring a result value outputted by an AI model by inputting the separated signal to the AI model using a multi-class separation; and executing a sleep mode of the home appliance and outputting a sleep mode switch notice when the result value is a user sleep, and requesting a feedback from the user when the result value is an unclear signal and updating the AI model using the feedback.

9 Claims, 8 Drawing Sheets

ARTIFICIAL INTELLIGENCE APPARATUS USING SOUND SIGNAL CLASSIFICATION AND METHOD FOR THE SAME

CROSS-REFERENCE TO RELATED APPLICATIONS

The present application claims priority under 35 U.S.C. 119 and 35 U.S.C. 365 to Korean Patent Application No. 10-2019-0115367 filed on Sep. 19, 2019, which is hereby incorporated by reference in its entirety.

BACKGROUND

The present disclosure relates to an artificial intelligence (AI) apparatus for operating a sleep mode of home appliance based on a sound signal classification and a method for the same. Specifically, the present disclosure relates to an AI apparatus and a method for the same, wherein a variety of apparatus used at home, IoT apparatus such as air conditioning, an air cleaner, a furnace, a refrigerator, lighting, an automated blind, a robotic vacuum, an AI speaker, and so forth, determines that a user is in a sleep state by classifying sound signals received in life, and when the user is in the sleep state, a mode is switched to a sleep mode.

In recent, a research and utilization on AI using a deep learning algorithm is active. An AI model based on the deep learning algorithm is learned using learning data. Labelled data is included in each learning data, and it is a result value of the AI model. A multi-class classification model among the algorithm is used as an algorithm for classification that separates three or more classes.

With regard to the present disclosure, there have been conventionally smart devices which deduces that a user is in a sleep state through a user's activity level or ambient light and change of a heart rate using a wearable apparatus or a mobile apparatus attached to a user body, and evaluates a sleep time and a sleep quality based on sensor information. However, such devices have had the problem of merely evaluating the user's sleep state and not improving a user's sleeping environment by substantially controlling peripheral devices.

SUMMARY

The present disclosure relates to an AI apparatus for determining whether an actual user is in a sleep state through an AI model by receiving a peripheral sound signal, and, when the user is in the sleep state, switching peripheral home appliances to a mode suitable for sleep, and a method for the same.

In addition, the present disclosure relates to an AI apparatus capable of determining a sleep state optimized to an individual user such that an unclear sound signal is adaptively learned in future in sleep states that may vary according to the user's environments in addition to general situations, and a method for the same.

An embodiment of the present disclosure provides an AI apparatus and a method for the same for receiving sound data in an input interface, determining a sleep state of the user by converting the received sound data into an input value of an AI model, and controlling the home appliance built in the AI apparatus to be in the sleep mode, when an output value of the AI model is a sleep state of the user.

In addition, according to an embodiment of the present disclosure, there is provided an AI apparatus and a method for the same wherein sound data received from the input interface is separated into a signal by the user or a signal created from a device, a user sleep state is determined by regarding the separated signals as an input value of the AI model, and when an output value of the AI model is the user sleep mode, the home appliance provided with the AI apparatus is controlled to be in a sleep mode.

In addition, according to an embodiment of the present disclosure, there is provided an AI apparatus and a method for the same wherein when an output value of the AI model is different from a state of an actual user or is unclear, the processor is configured to request a feedback for whether the user was in a sleep or non-sleep state during a corresponding sleep detection mode execution time to the user, and the feedback of the corresponding user is stored and used as learning data of the AI model.

According to a variety of embodiments of the present disclosure, unlike conventional smart apparatus that evaluates a user's sleeping environment, the home appliance provided with a personalized AI apparatus by controlling the peripheral home appliances to improve an actual sleep environment of the user, and re-learning the AI model when the output value of the AI model is different from the state of the actual user or is unclear, can be supplied to the user.

DETAILED DESCRIPTION OF THE EMBODIMENTS

Figure 1:
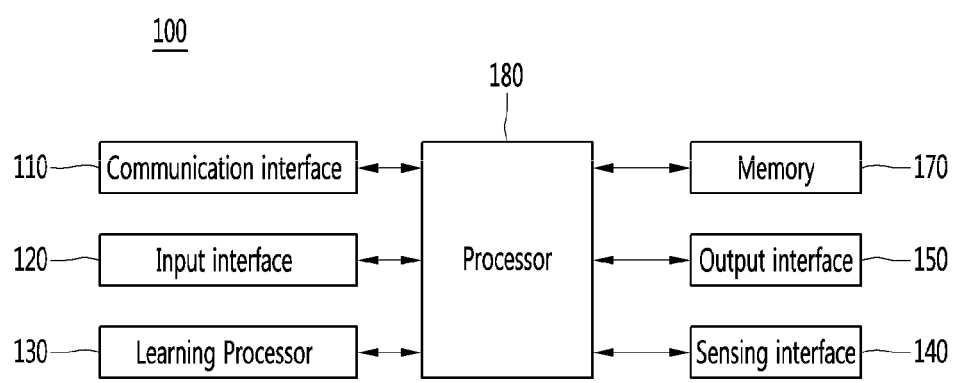
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
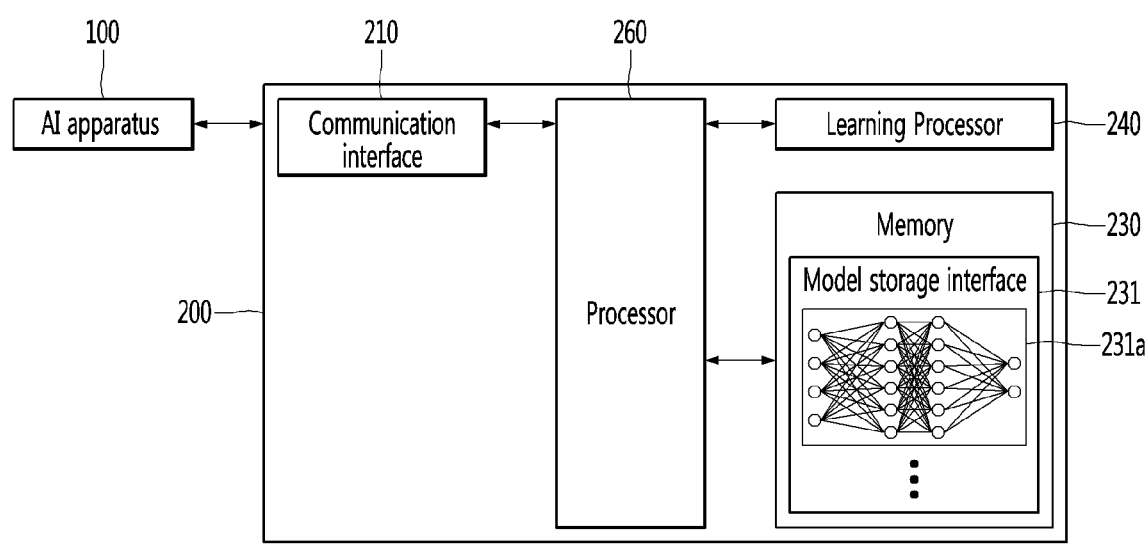
FIG. 2 is a block diagram illustrating an AI server according to an embodiment of the present disclosure.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
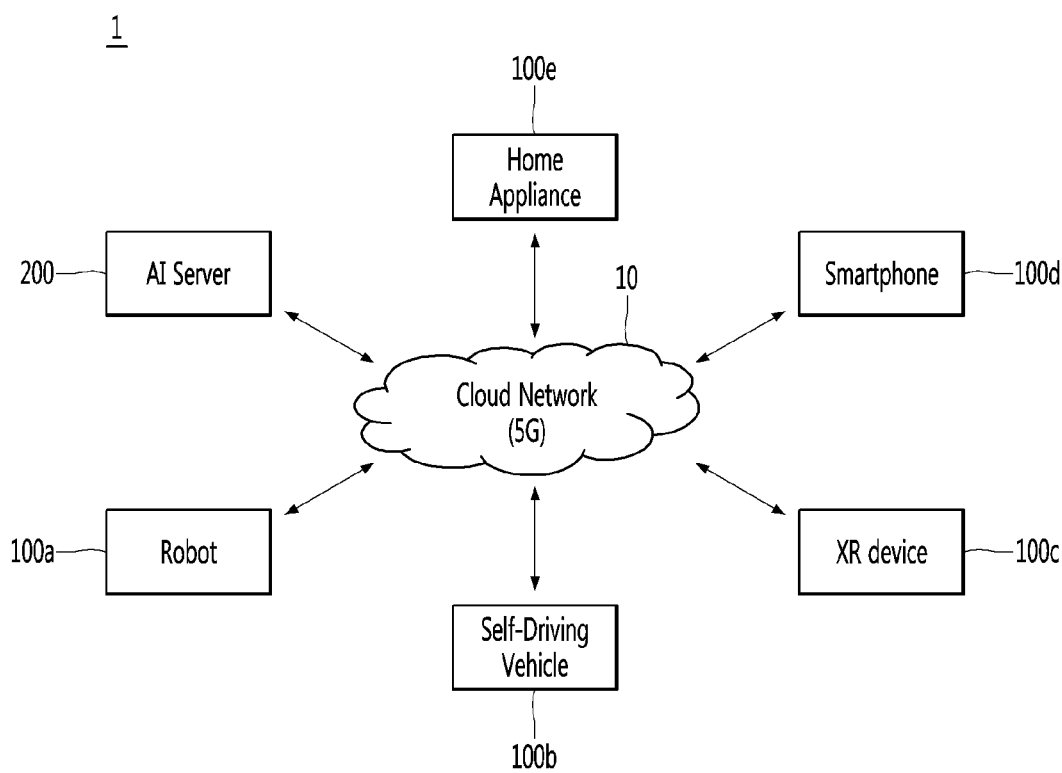
FIG. 3 is a view illustrating an AI system according to an embodiment of the present disclosure.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

According to an embodiment of the present disclosure, the home appliance provided with the AI apparatus may be controlled to be in the sleep mode by performing a scene detection through a sound signal acquired in a specific time based on apparatus used in the home appliance being provided with a microphone, and determining the sleep mode of the user.

Specifically, the AI apparatus according to an embodiment of the present disclosure may comprise an input interface configured to receive a sound signal; and a processor configured to control the home appliance to execute a sleep mode when an output value of the AI model is determined to be a user sleep, by using the sound signal received from the input interface as the input value of the AI model. In addition, according to an embodiment of the present disclosure, the processor may include a case that the input interface receives a sound signal limitedly in a pre-set time from a sleep detection mode execution time pre-set by the user, and the sound signal is an input value of the AI model.

The sleep mode may include that the processor is configured to lower illuminance of the corresponding home application in the home appliance provided with the AI apparatus, and, when there are an operation of lowering noises and a motor or pen operation, control the operation to be stopped. Separately, in the case of the home appliance provided with a low noise mode or a power saving mode, the sleep mode may mean a low sound mode or a power saving mode.

Hereinafter, FIG. 4 explains an order of the present disclosure in detail.

Figure 4:
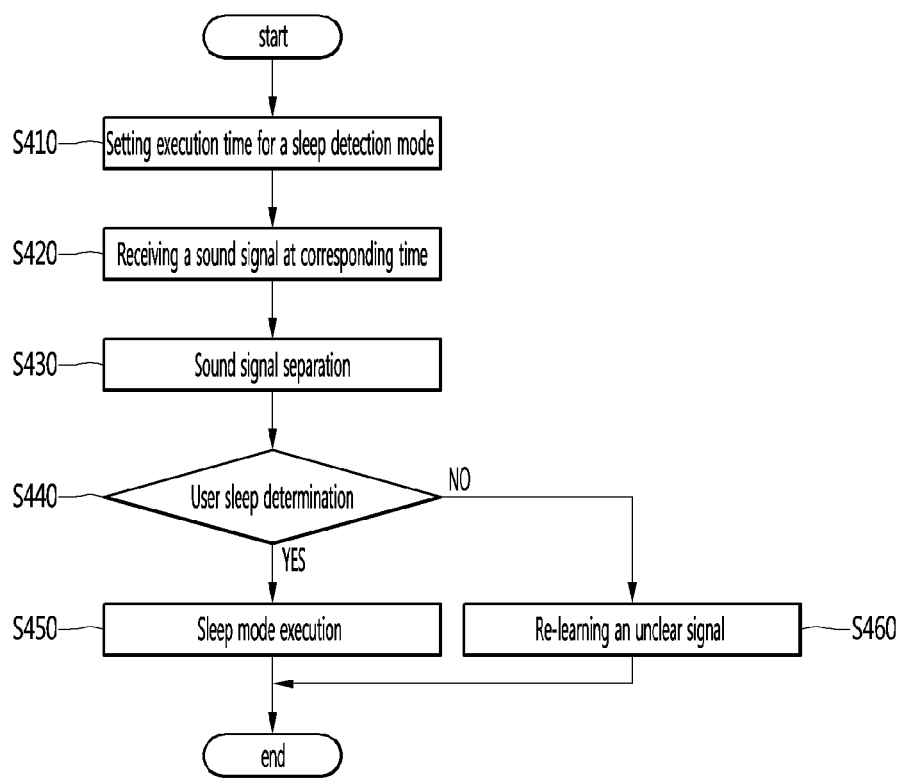
FIG. 4 is an entire flow chart according to an embodiment of the present disclosure.

FIG. 4 is an entire flow chart according to an embodiment of the present disclosure.

Referring to FIG. 4, the user may set execution time for a sleep detection mode in the home appliance provided with the AI apparatus (S410). Thereafter, the processor 180 may receive the sound signal by controlling the input interface 120 in the sleep detection mode execution time set by the user and acquire a corresponding time sound signal (S420). In addition, the processor 180 may store the time set by the user and the sound signal received from the input interface 120 in the memory 170.

Specifically, the processor 180 may control the sound signal of the input interface 120 to be received during the sleep detection mode execution time set by the user. The sound signal received by the input interface 120 may be used as an input value of the AI model.

For example, the user may set execution time for the sleep detection mode for one hour from 10 p.m. Therefore, the sleep detection mode is terminated at 11 p.m., and the input interface 120 may receive the sound signal using a microphone during the time. By means of the method above, the processor 180 may acquire the sound signal received from the input interface 120. In addition, the received sound signal information may be stored in the memory 170.

According to an embodiment of the present disclosure, the processor may separate the sound signal received from the input interface 120 into a signal by a user and a device signal (S430).

Specifically, the sound signal received from the input interface 120 may include a sound signal created by the user and a sound signal created from the peripheral home appliance, and a sound signal in which waveforms such as living noises, static noises, and the like, are mixed. Therefore, through a preprocessing process of the sound signal received above, the noises may be removed and the sound signal may be separated into the signal created by the user and the other device signals to allow the sound signal to be an input value of the AI model.

More specifically, by means of a manner of reducing the noises of the signal acquired from the input interface 120 and separating the signal, a system is configured in an LMS (Least Mean Square) technique, a BSS (Blind Source Separation) technique and a half-duplex communication shape, and an algorithm that avoids the same may be used.

For example, the processor 180 may acquire the sound signal received through the input interface 120 during the sleep detection mode execution time set by the user, i.e., from 10 p.m. to 11 p.m. The acquired sound signal may be a waveform in which static noises, living noises, and the sound signal by the user are mixed. The processor 180 may remove the noises of the waveform acquired from the input interface 120. In addition, the signal may be separated into i) a signal by the user and ii) the device signal. The separated signals may be the input value of the AI model. Herein, i) the signal by the user may include non-sleep signals such as a footstep signal, a hammering signal, a conversation signal, a restroom using signal, an exercise signal and the like, and sleep signals such as a breathing signal and a snoring signal and the like. In addition, ii) the device signal may include signals of the home appliance provided with an AI apparatus, such as a TV signal, a cleaner signal, a washing machine signal and the like.

Thereafter, the processor 180 may determine a sleep state of the user by regarding the sound signals from which the noises are separated and removed in the process of S430 as the input value of the AI model (S440). The process above will be described in detail in FIGS. 5 and 6.

According to an embodiment of the present disclosure, the processor 180 may perform the sleep mode of the home appliance when the result value of the AI model is a user sleep (S450). The processor 180 may display a sleep mode switch notice of the home appliance by controlling the output interface 150.

According to an embodiment of the present disclosure, the processor 180 may request a feedback for whether the user was in a sleep or non-sleep state during a corresponding sleep detection mode execution time to the user, when the result value of the AI model is an unclear signal, and may update the AI model using data of the feedback (S460). Hereinafter, S440 as a user sleep determination process will be described in detail in FIGS. 5 and 6.

Figure 5:
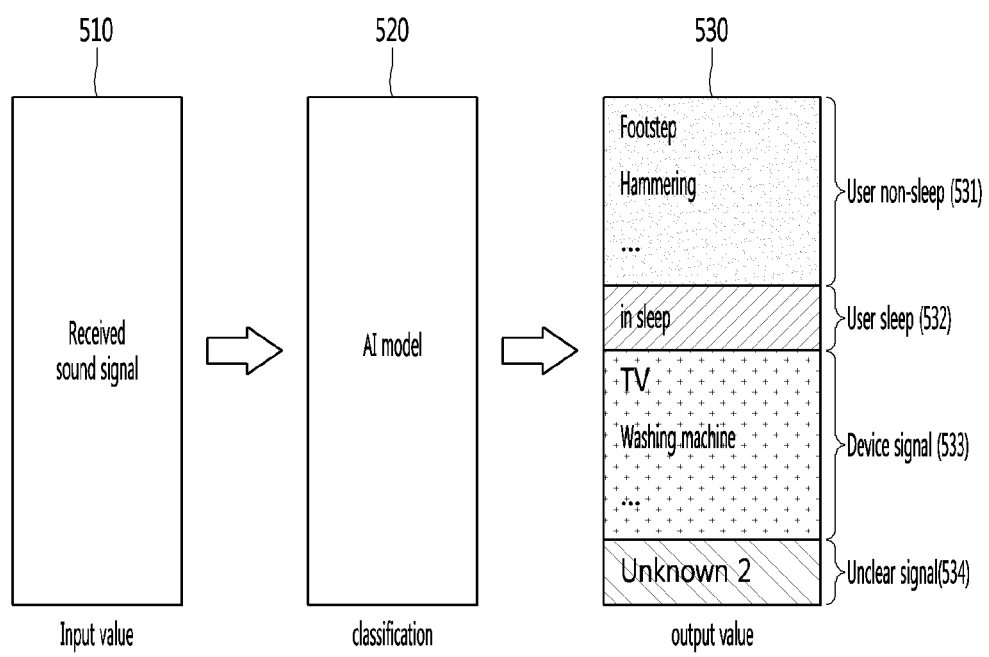
FIG. 5 illustrates an AI model according to an embodiment of the present disclosure.
Figure 6:
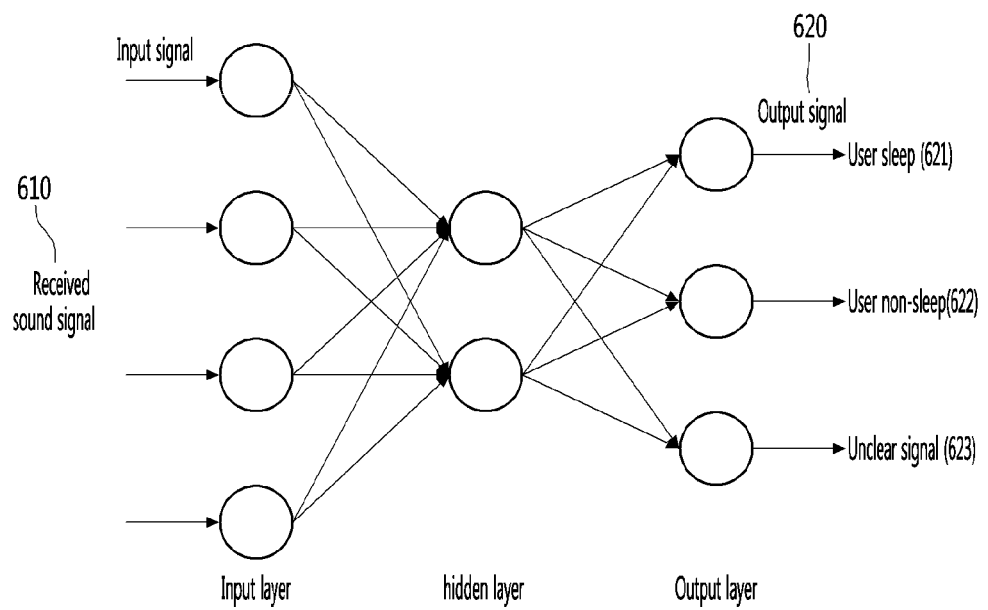
FIG. 6 illustrates an AI model according to an embodiment of the present disclosure.

FIGS. 5 and 6 illustrate an AI model according to an embodiment of the present disclosure.

Referring to FIGS. 5 and 6, the AI model is a model that classifies the sound signal received from the input interface 120 into a user non-sleep, a user sleep, a device signal and an unclear signal according to previously learned data, and may include an AI model for performing at least three multi-class classification by the output value.

Specifically, the multi-class classification means having three or more classes as the output value of the AI model in machine learning, and the feature of the input value is extracted to determine one class. In an algorithm of the multi-class classification, decision trees, support vector machines and neural networks may be included.

According to an embodiment of the present disclosure, the input 510 of the AI model may be a sound signal received through the input interface 120. In addition, through the processing process (S430), the sound signal may be a signal separated into the signal by the user and the device signal. An AI model 520 may perform the multi-class classification by using the received sound signal 510 as the input value, and may derive one result value among a user non-sleep 531, a user sleep 532, a device signal 533 and an unclear signal 534 as a result value 530 which the AI model outputs.

Referring to FIG. 6, the AI model in which the neural network is used, may include a neural network configured to use the sound signal received from the input interface 120 as an input value 610, and adjust a weighted value by training that labels a user sleep 621, a user non-sleep 622 and a unclear signal 623 as a result value 620. In addition, according to an embodiment of the present disclosure, the output value of the AI model may further comprise the device signal.

According to an embodiment of the present disclosure, when the result value of the AI model is user sleeps 532, 621, the processor 180 may switch the home appliance provided with the AI apparatus to the sleep mode and may display a notice of informing a sleep mode switch of the home appliance by controlling the output interface 150.

In addition, according to an embodiment of the present disclosure, the AI apparatus may further comprise a communication interface 110 configured to communicate with at least one home appliance. When the result value that the AI model is outputted is the user sleep, the processor 180 may control the at least one home appliance to execute the sleep mode through the communication interface 100.

For example, there is a robot cleaner provided with the AI apparatus. The robot cleaner receives the sound signal from the input interface 120 during 10 p.m. to 11 p.m. that is a sleep detection mode execution time pre-set by the user. The processor 180 is configured to remove the noises from the received sound signal through the pre-process and separate the received sound signal into the signal by the user and the device signal and then to allow the signal to be the input value of the AI model.

The AI model determines the sleep mode of the user by using the received sound signal, and the processor 180 is configured to execute the sleep mode of the robot cleaner when the user is in the sleep state. The communication interface 110 may communicate with other home appliances (for example, TV, a washing machine, a drying machine and the like), and the processor 180 may transmit a command for controlling other home appliances communicating with the robot cleaner to be switched to the sleep mode by controlling the communication interface 110. The other home appliance may receive a control signal for a sleep mode switch from the robot cleaner. The processor of the home appliance which receives the control signal may switch the corresponding apparatus to the sleep mode.

That is, by using communication with the robot cleaner, in the case of air conditioning, a cooling mode may be switched to a tropical night or a power saving mode, and in the case of the washing machine, the mode may be switched to a low noise mode, and the case of the air cleaner, the mode may be switched to a sleep mode. The sleep mode may be used with the low noise mode, the sleep mode or the power saving mode.

Hereinafter, a personalized learning will be described in FIG. 7.

Figure 7:
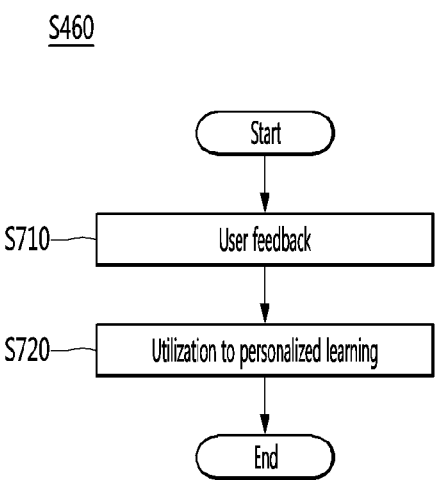
FIG. 7 is a personalized learning flow chart according to an embodiment of the present disclosure.

FIG. 7 is a personalized learning flow chart according to an embodiment of the present disclosure.

Referring to FIG. 7, when the output value of the AI model is unclear, the processor 180 may request a feedback for whether the user was in a sleep or non-sleep state during a corresponding sleep detection mode execution time to the user (S710), and may update the AI model using corresponding feedback data to utilize the updated AI model to personalized learning (S720).

For example, the processor 180 of the robot cleaner is configured to input the sound signal received from the input interface 120 in the AI model for 10 p.m. to 11 p.m. as the sleep detection mode execution time set by the user. When the output value of the AI model is an unclear signal, the processor 180 of the robot cleaner may request a feedback for whether the user was in a sleep or non-sleep state during a corresponding sleep detection mode execution time to the user by controlling the output interface 150. In addition, the user may be request to perform the feedback by providing him/her with a notice through mobile apparatus, smart watches or other applications connected to the robot cleaner. The processor 180 may update a label of the AI model by using feedback data of the user and use the updated label.

Hereinafter, when the sleep mode is terminated, the process of switching to a general mode will be described.

Figure 8:
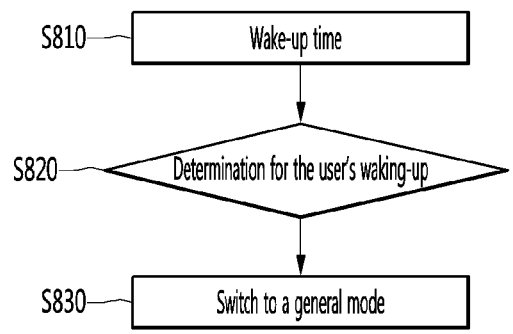
FIG. 8 is a general mode switch flow chart according to an embodiment of the present disclosure.

FIG. 8 is a general mode switch flow chart according to an embodiment of the present disclosure.

Referring to FIG. 8, when a wake-up time pre-set by the user allows, the processor 180 may determine whether the user wakes up or not (S820), and switch the corresponding home appliance from the sleep mode to the general mode.

For example, when the wake-up time set by the user allows, if the home appliance provided with the AI apparatus is under normal operation, the processor 180 of the robot cleaner provided with the AI apparatus may receive the sound signal by controlling the input interface 120 when the pre-set wake-up time allows, and use the received sound signal as the input value of the AI model, and when the output value outputted by the AI model is user sleeps 532, 621, the processor 180 may relieve the sleep mode of the robot cleaner and switch the sleep mode to the general mode (S830).

In addition, according to an embodiment of the present disclosure, the processor 180 may relieve the sleep modes of the other home appliances by controlling the communication interface 110 and switch the sleep modes to the general modes.

For example, the communication interface 110 of the robot cleaner may communicate with other home appliances (for example, TV, a washing machine, a drying machine and the like), and the processor 180 may transmit a command for controlling the home appliances communicating with the robot cleaner to switch from the sleep mode to the general mode by controlling the communication interface 110. The other home appliance may receive a control signal for a sleep mode switch from the robot cleaner. The processor of the home appliance receiving the control signal may switch the corresponding apparatus to the general mode.

That is, by using communication with the robot cleaner, in the case of air conditioning, the tropical night or the power saving mode may be switched to the cooling mode, and in the case of the washing machine, the low noise mode may be switched to the general mode, and the case of the air cleaner, the sleep mode may be switched to the general mode. In addition, the sleep mode may be used with the low noise mode, the sleep mode or the power saving mode.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence (AI) apparatus mounted on home appliance, comprising:
an input interface configured to receive a sound signal using a microphone; and
a processor configured to;
obtain, via the input interface, the sound signal,
provide the sound signal as an input value to an AI model,
control the home appliance to execute a sleep mode when an output value of the AI model is determined to be a user sleep,
wherein the AI model comprises a multi-class classification model that classifies a user non-sleep, a user sleep, a device signal, and an unclear signal as a result value based on previously learned data,
wherein the multi-class classification model comprises a neural network configured to use a sound signal as the input value, and adjust a weight by a training, and
wherein the weight of the neural network is adjusted by using a sound signal as the input value and labeling the user sleep, the user non-sleep, and the unclear signal as the result value.

2. The AI apparatus according to claim 1, wherein the processor is configured to remove noises of the sound signal received from the input interface, separate a signal from which the noises are removed, into a signal by a user and the apparatus signal, and use the separated signals as the input value of the artificial intelligence model.

3. The AI apparatus according to claim 1, wherein the processor is configured to use the sound signal received by the input interface as the input value of the artificial intelligence model, during a sleep detection mode execution time set by the user.

4. The AI apparatus according to claim 3, wherein the processor is configured to relieve the sleep mode of the home appliance when the result value of the artificial intelligence model according to the sound signal received from the input interface is the user sleep, after passing a wake-up time preset by the user.

5. The AI apparatus according to claim 1, wherein the processor is configured to request a feedback for whether the user was in a sleep or non-sleep state during a corresponding sleep detection mode execution time to the user, and update the AI model using corresponding feedback data, when the result value of the AI model is the unclear signal.

6. The AI apparatus according to claim 1, further comprising a communication interface configured to communicate with at least one home appliance,
wherein the processor is configured to control the at least one home appliance to execute the sleep mode through the communication interface, when the result value of the AI model is the user sleep.

7. The AI apparatus according to claim 1, further comprising an output interface configured to display a sleep mode switch notice of the home appliance when the result value of the AI model is the user sleep.

8. A method for controlling an AI apparatus mounted on home appliance, the method comprising:
receiving a sound signal at a predetermined time;
removing noises of the received signal and separating the signal from which the noises are removed, into a signal by a user and a device signal;

acquiring a result value outputted by an AI model by inputting the separated signal to the AI model using a multi-class separation; and executing a sleep mode of the home appliance and outputting a sleep mode switch notice when the result value is a user sleep, and requesting a feedback from the user when the result value is an unclear signal and updating the AI model using the feedback, wherein the AI model comprises a multi-class classification model that classifies a user non-sleep, a user sleep, a device signal, and an unclear signal as a result value based on previously learned data, wherein the multi-class classification model comprises a neural network configured to use a sound signal as the input value, and adjust a weight by a training, and wherein the weight of the neural network is adjusted by using a sound signal as the input value and labeling the user sleep, the user non-sleep and the unclear signal as the result value.

9. A non-transitory computer-readable medium storing thereon a program for performing a method for controlling an AI apparatus mounted on home appliance, wherein the method for controlling an AI apparatus comprises:

receiving a sound signal at a predetermined time;

removing noises of the received signal and separating the signal from which the noises are removed, into a signal by a user and a device signal;

acquiring a result value outputted by an AI model by inputting the separated signal to the AI model using a multi-class separation; and executing a sleep mode of the home appliance and outputting a sleep mode switch notice when the result value is a user sleep, and requesting a feedback from the user when the result value is an unclear signal and updating the AI model using the feedback, wherein the AI model comprises a multi-class classification model that classifies a user non-sleep, a user sleep, a device signal, and an unclear signal as a result value based on previously learned data, wherein the multi-class classification model comprises a neural network configured to use a sound signal as the input value, and adjust a weight by a training, and wherein the weight of the neural network is adjusted by using a sound signal as the input value and labeling the user sleep, the user non-sleep and the unclear signal as the result value.

\* \* \* \* \*